Dec. 5, 1967     J. PRUSSAK     3,356,190
COMPENSATING PLAY DEVICE FOR THE BRAKING OF ROTATING
MEMBERS SUCH AS SHAFTS, PULLEYS AND THE LIKE
Filed March 11, 1965     11 Sheets-Sheet 2
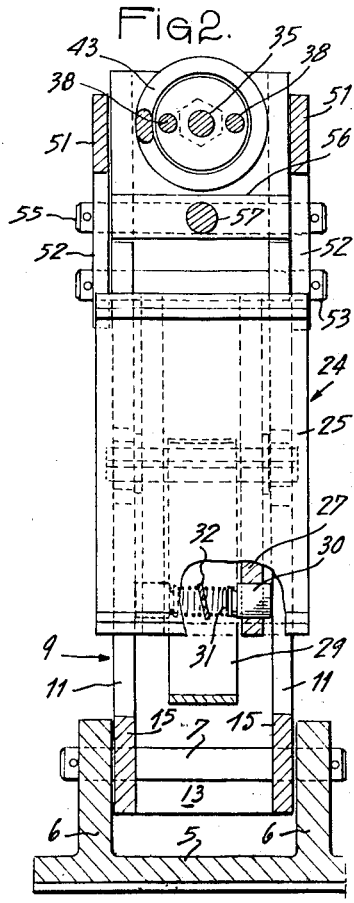
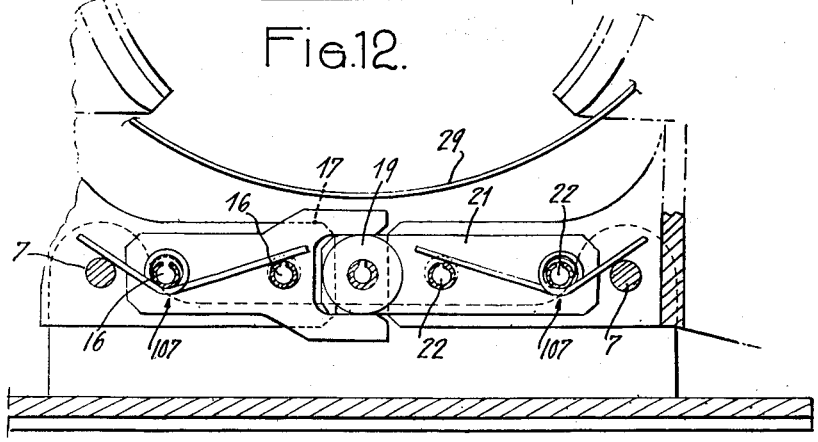
INVENTOR
JACOB PRUSSAK
Att'ys.

Dec. 5, 1967       J. PRUSSAK       3,356,190
COMPENSATING PLAY DEVICE FOR THE BRAKING OF ROTATING
MEMBERS SUCH AS SHAFTS, PULLEYS AND THE LIKE
Filed March 11, 1965       11 Sheets-Sheet 3
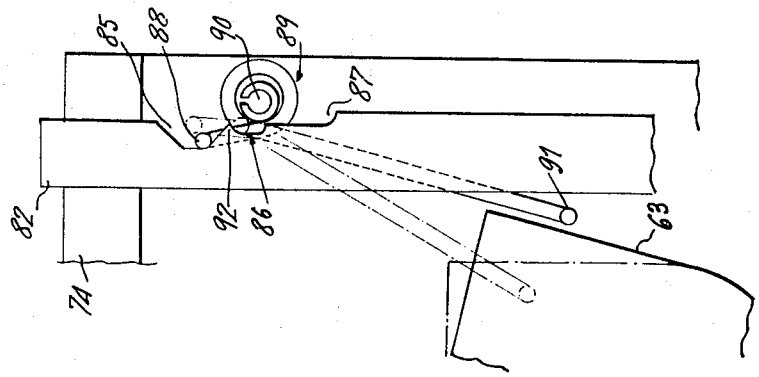
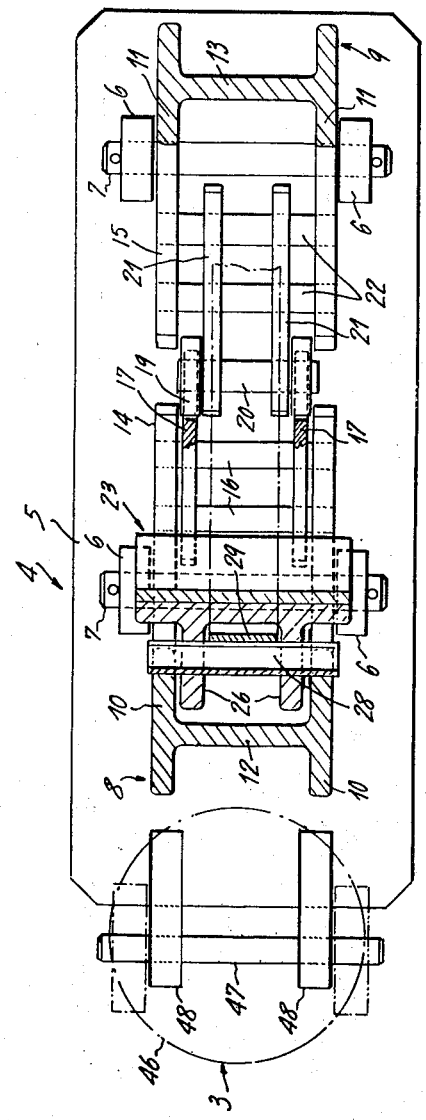
INVENTOR
JACOB PRUSSAK

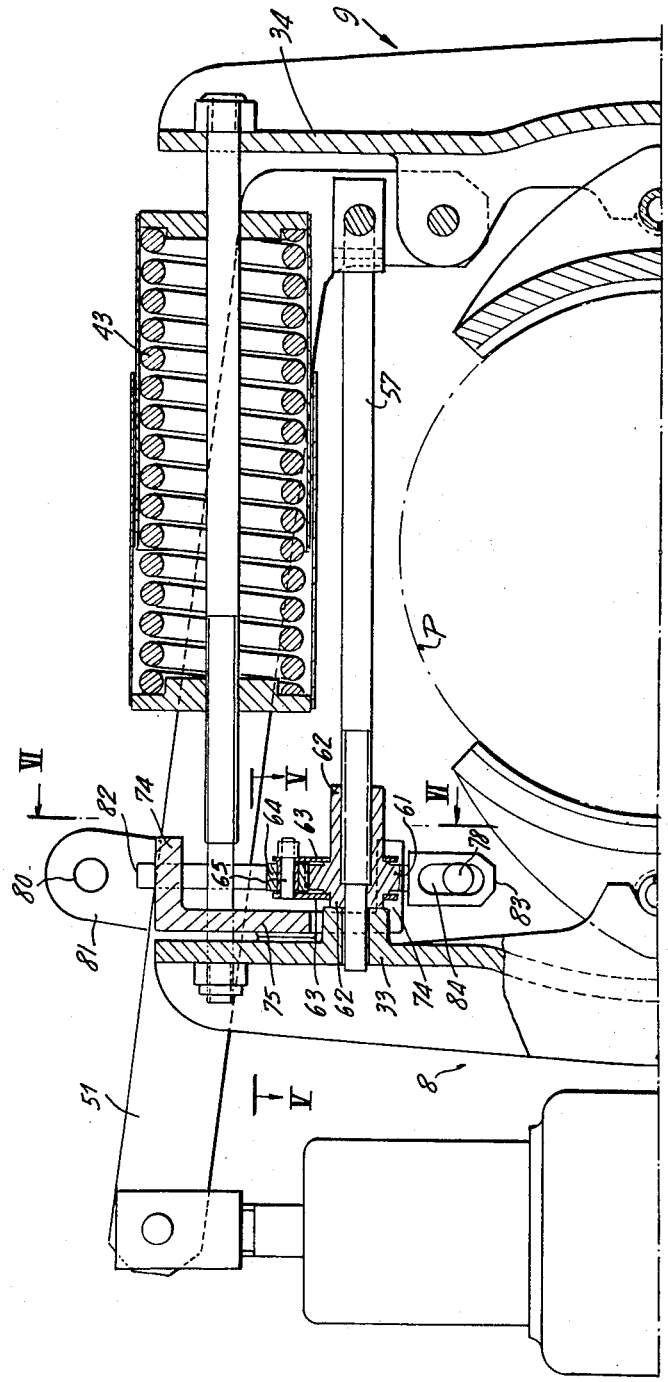

INVENTOR
JACOB PRUSSAK

Dec. 5, 1967  J. PRUSSAK  3,356,190
COMPENSATING PLAY DEVICE FOR THE BRAKING OF ROTATING
MEMBERS SUCH AS SHAFTS, PULLEYS AND THE LIKE
Filed March 11, 1965  11 Sheets-Sheet 6
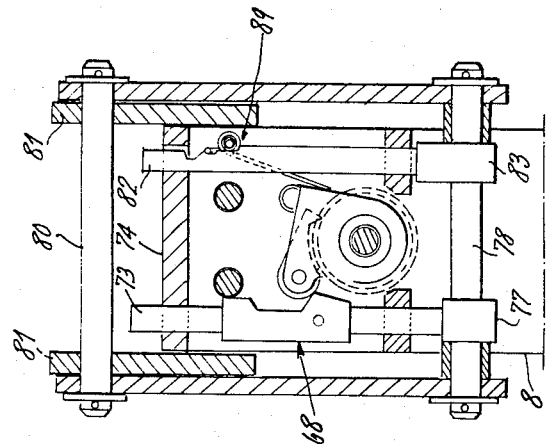
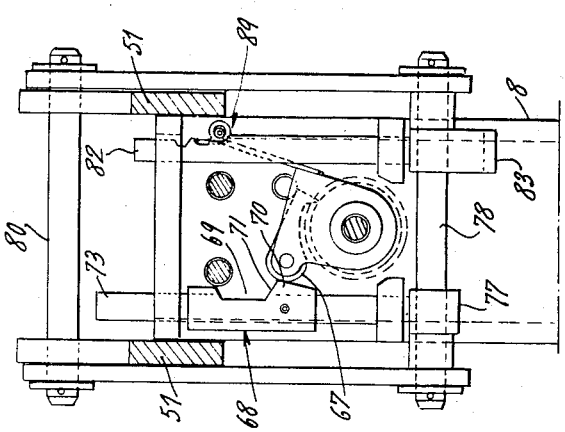
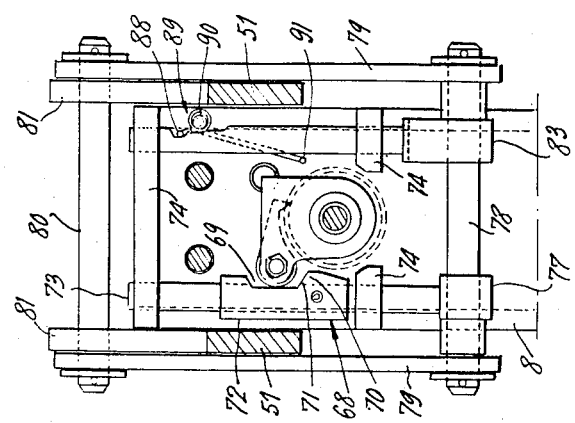
INVENTOR
JACOB PRUSSAK
*Imirie & Smiley*
Att'ys.

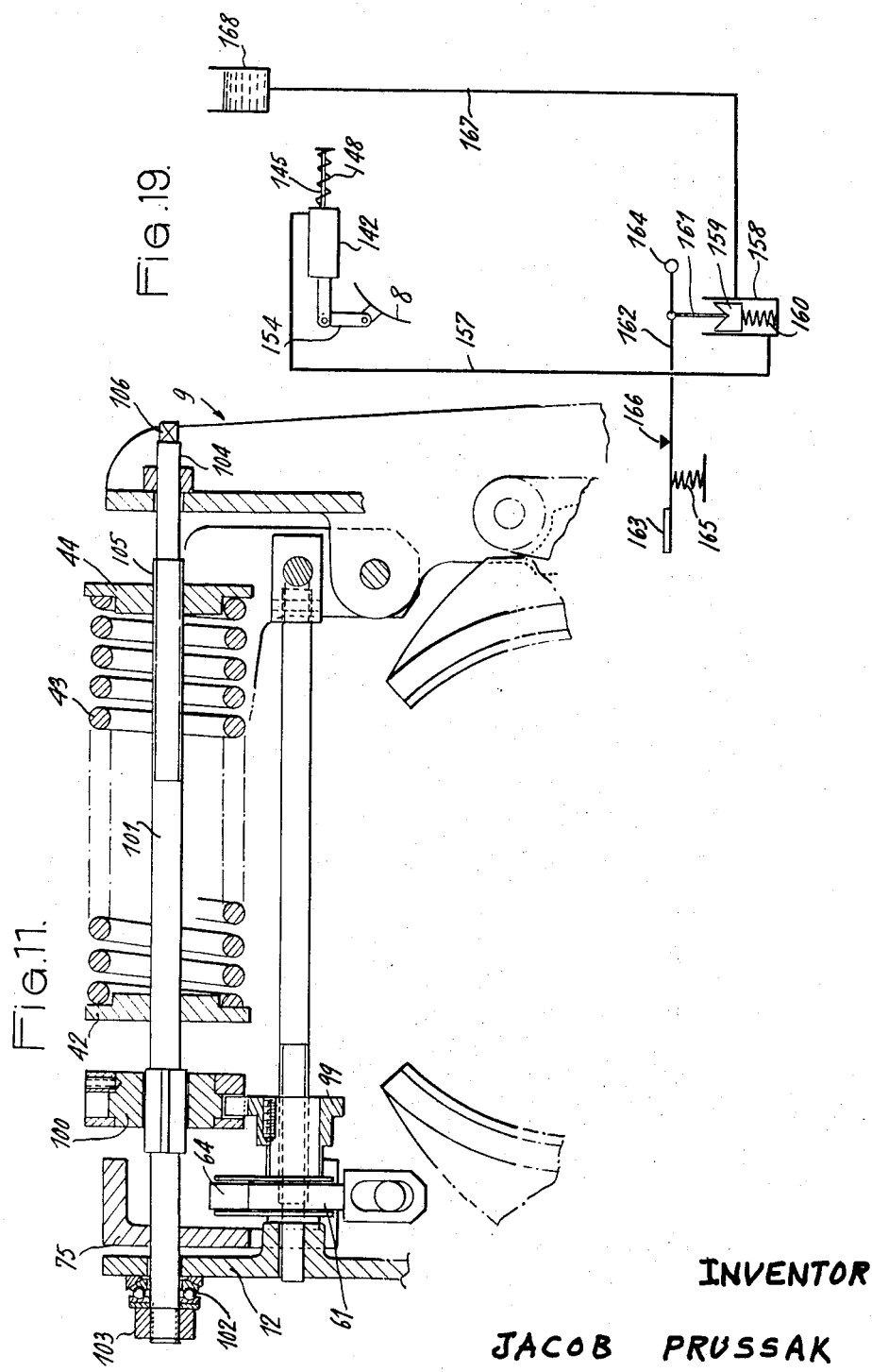

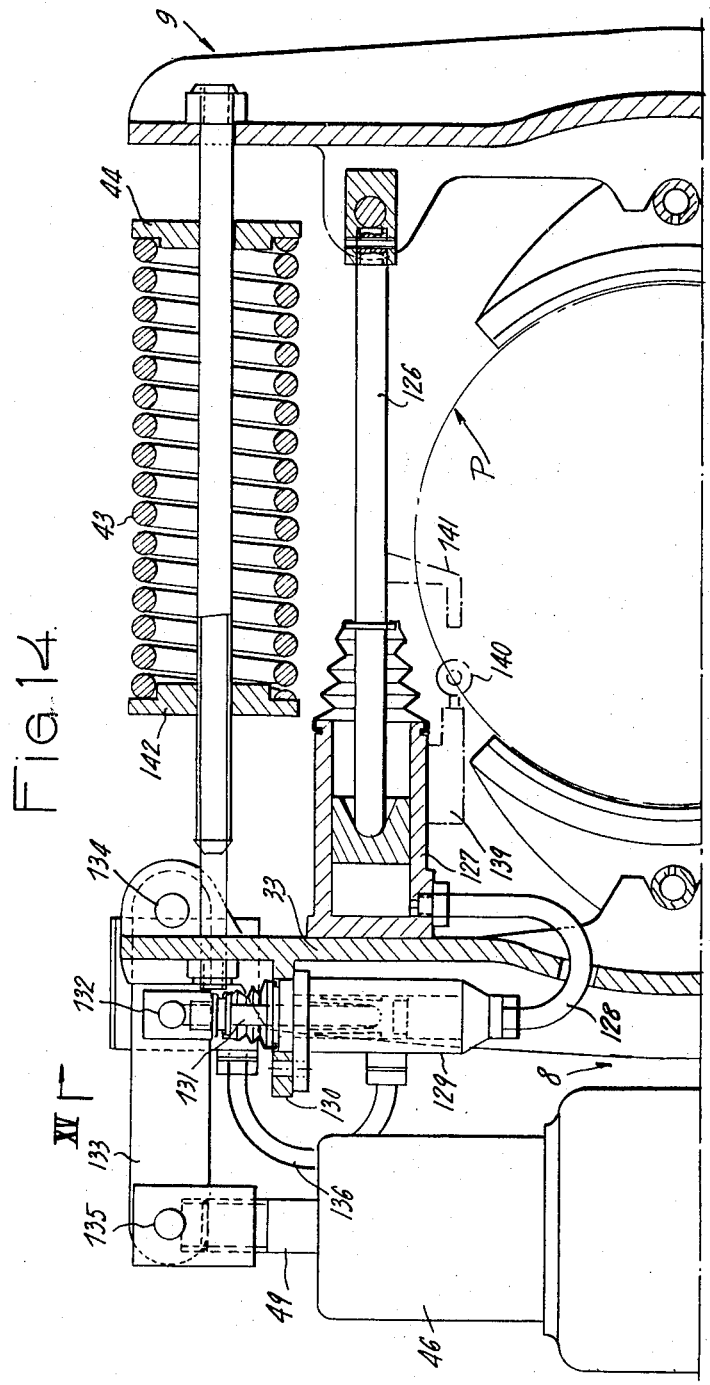

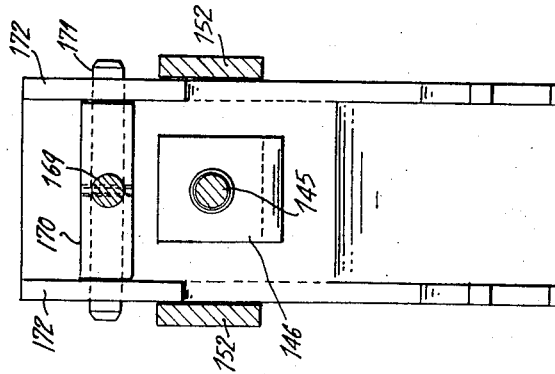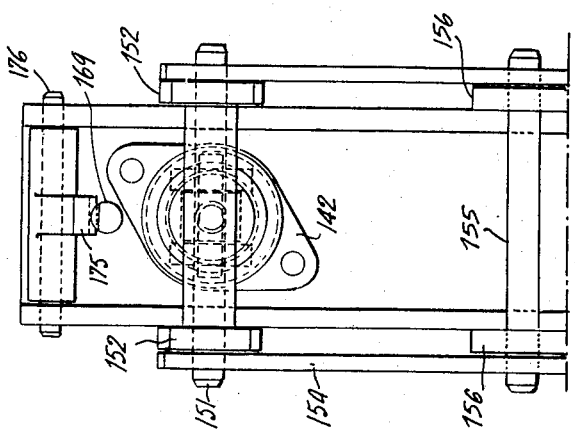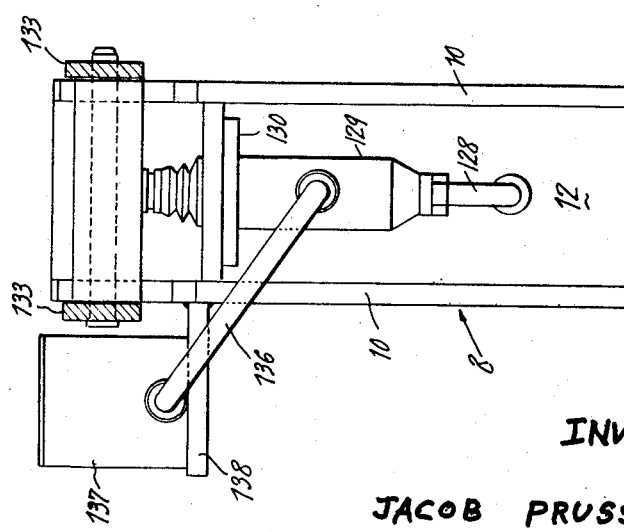

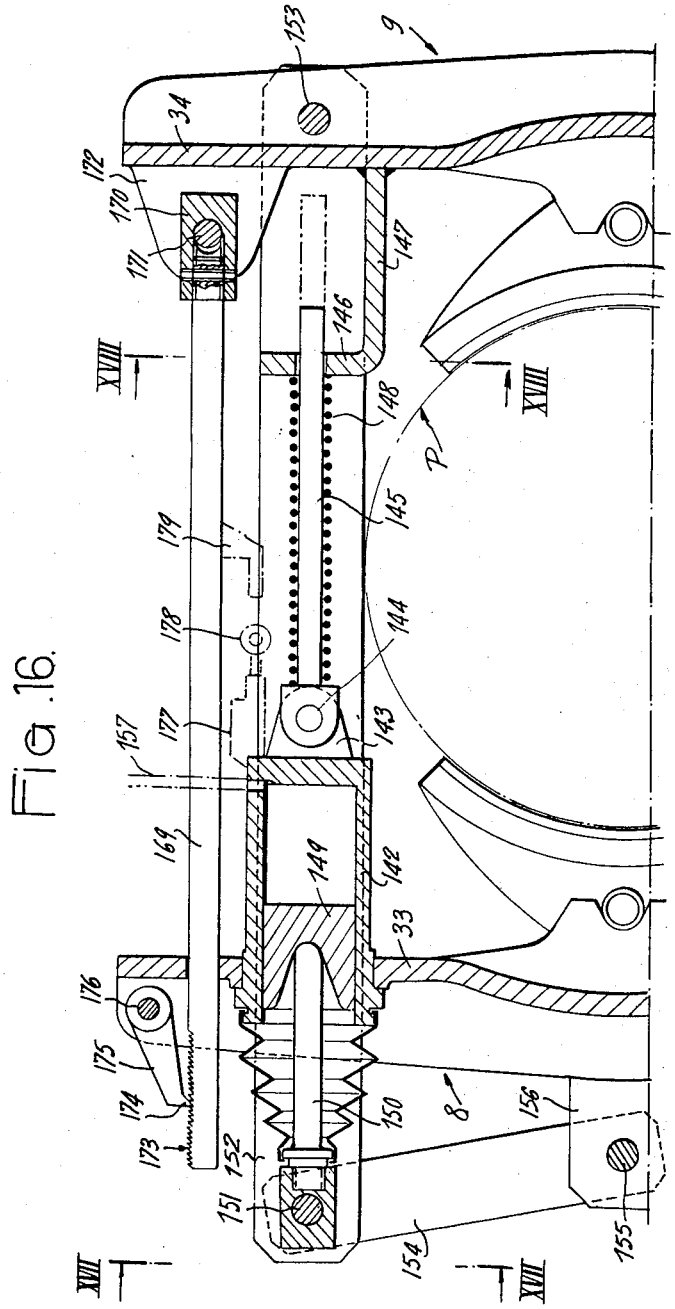

United States Patent Office 3,356,190
Patented Dec. 5, 1967

3,356,190
COMPENSATING PLAY DEVICE FOR THE BRAKING OF ROTATING MEMBERS SUCH AS SHAFTS, PULLEYS AND THE LIKE
Jacob Prussak, Paris, France, assignor to Maurice Demont, Clichy, Seine, France
Filed Mar. 11, 1965, Ser. No. 439,029
Claims priority, application France, Mar. 25, 1964, 968,694, Patent 1,398,074
6 Claims. (Cl. 188—171)

In the devices for braking rotating members, the play in the pivoting joints appears at the moment when changes of functions occur, that is upon engaging and disengaging the working movable parts, when a more or less longer use has resulted in highly wearing out the pins and the bearings thereof. During a brake applying function, the taking-up of said play takes the entire stroke of the movable parts and the engagement is not strongly insured at the end of the stroke between the friction linings and the member to be braked. Also, during the release, the taking-up of the play takes the entire stroke of the movable elements and the friction linings are not correctly disengaged from the member to be braked.

The present invention eliminates these drawbacks in providing a new braking device for rotating members, which is so designed that the different strains and efforts exerted upon its constitutive elements, more particularly the movable parts, are always directed in the same direction thereby to obtain, whatever may be the applying or releasing effected stroke and the wear extent of the various pivoting joints, an automatic compensation of the plays and an integral consecutive effect (i.e. without any lost motion on the movable parts during the stroke of the member controlling the same).

According to this invention, said device includes a frame supporting two vertical pivoting jaws, which are respectively disposed on either side of the rotating member to be braked, the displacements of said jaws being controlled by two operating members acting in opposition which insure respectively the applying and the releasing of two working movable parts constituted by two curved shoes, the face of these shoes which confronts the face provided with a friction lining forming two stiffening ribs through which extends a press-fitted pivot pin which is housed and retained in two recesses in the respective jaw, by the ends of a compensating spring leaf.

Various other features of this invention will be revealed when reading the following detailed description with reference to the annexed drawings which show, in an illustrative and by no means limitative manner, some embodiments of this invention, and in which:

FIG. 2 is a cross-section taken substantially along the line II—II in FIG. 1.

FIG. 3 is a sectional horizontal view taken substantially along the line III—III in FIG. 1.

FIG. 4 is a half-elevation, partly in section, of an alternative embodiment of the invention.

FIG. 6 is a fragmentary cross-section taken substantially along the line VI—VI in FIG. 4.

FIGS. 6a and 7 are fragmentary views at a larger scale showing respectively two constitutive members of the device.

FIGS. 8 and 9 are cross-sections showing at a smaller scale the characteristic positions of some of device members during the operation thereof.

FIGS. 11, 12 and 13 are fragmentary views partly in elevation and partly in section showing at a larger scale other alternative embodiments of said device.

FIG. 14 is a half-view, partly in elevation and partly in section, illustrating an embodiment of one of the control members of the device.

FIG. 15 is a cross-section taken along the line XV—XV in FIG. 14.

FIG. 16 is a half-view, partly in elevation and partly in section, showing an alternative embodiment of the device control members.

FIGS. 17 and 18 are cross-sections taken respectively along the lines XVII—XVII and XVIII—XVIII in FIG. 16.

FIG. 19 is a diagrammatical view showing the control circuit for such a device.

Figure 1:
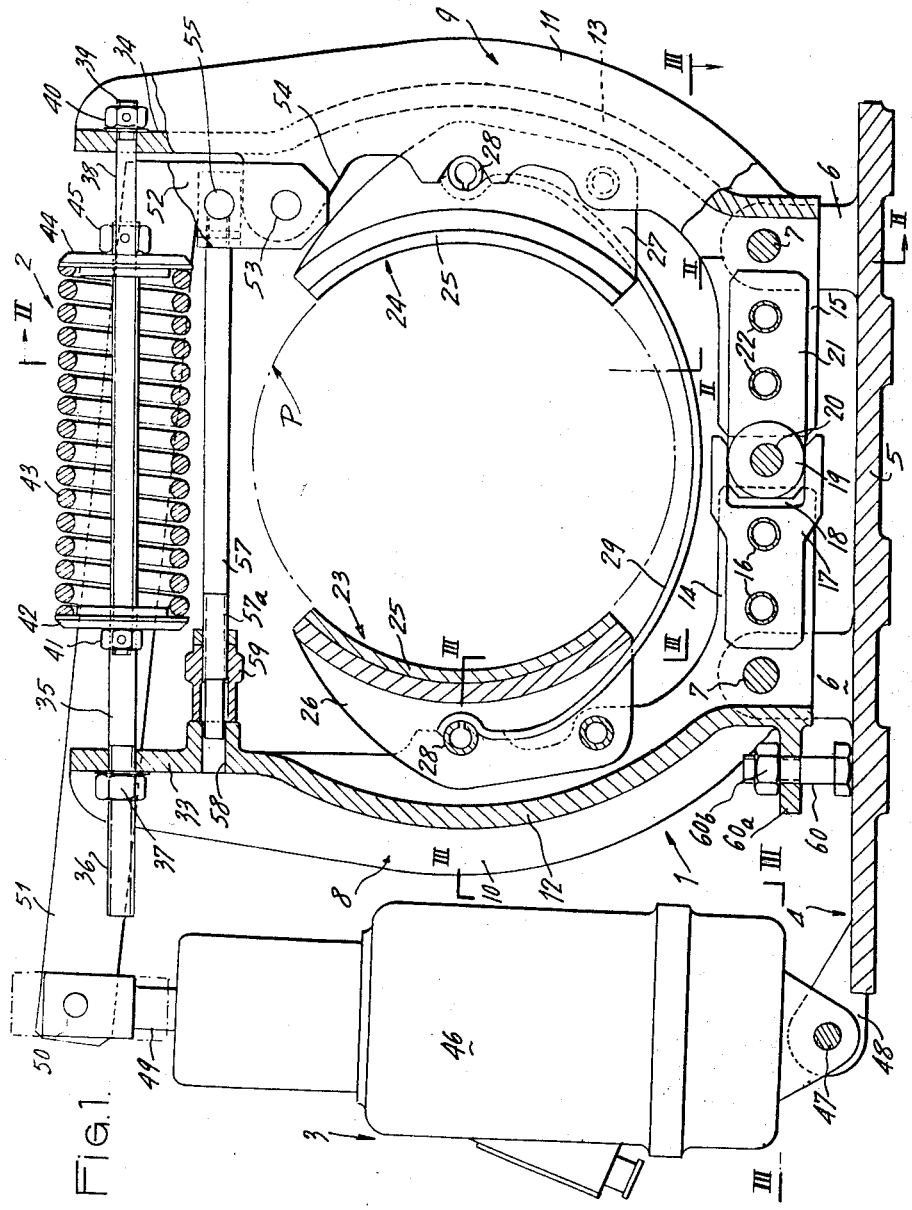
FIG. 1 shows, partly in elevation and partly in section, the braking device according to this invention.
Figure 7:
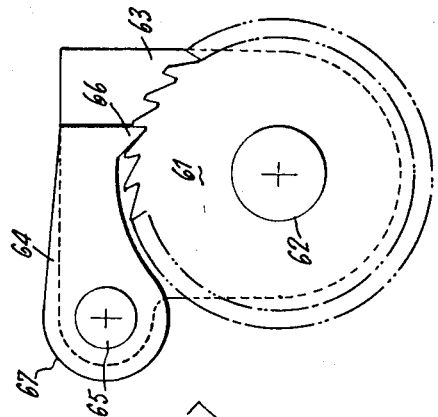

According to the first embodiment of the invention illustrated in FIGS. 1 to 3, the device adapted to brake a piece P diagrammatically shown in dot-and-dash line, which may be a shaft, a pulley, a flange, a flywheel or any like member, includes a play compensating mechanical unit 1 alternatively controlled by or servoed to two control members 2 and 3, respectively provided for engaging and releasing working movable parts comprised in said mechanical unit 1.

This mechanical unit includes a frame 4 defining a sole-plate 5 by which it is fast transversely to the axis of rotation of the piece P to be braked. The upper face of the sole-plate 5 forms four bearings 6 for two parallel pins or studs 7, upon which are mounted vertical pivoting jaws 8 and 9 which maintain the working parts. Said jaws 8 and 9, shaped in the example illustrated in the drawings so as to present in a transverse direction an H-shaped cross-section, are in addition designed so as to be constantly maintained in a motion relationship thereby to be caused to effect conjugated displacements on the pins 7.

Thus, each jaw forms, at the lower part of the wings or flanges thereof 10 or 11 which are connected by a central web member 12 or 13, two horizontal extensions 14 and 15 which have a parallel relationship and face the extensions of the opposite jaw. Said extensions 14 support two pins 16 upon which are mounted, as most clearly shown in FIG. 3, two forks 17 defining recesses 18. The latter are provided to accommodate two rollers 19 mounted upon a pin 20 carried by two small bars 21 which are telescoped in a manner like the forks 17 upon two pins 22 the ends of which are engaged in the extensions 15 of jaw 9. In this manner, when one of the jaws is moved in either direction relatively to the piece P, the forks 17 or the rollers 19 act upon the complementary parts of the opposite jaw which is thus caused to move simultaneously and symmetrically with the controlled jaw, with respect to the vertical axis of the piece P to be braked.

Such an arrangement allows to obtain, irrespective of the decomposed stresses transmitted by one or the other of the control members 2 and 3, a simultaneous action of the unit 1 working movable parts, as well as the centering of these parts on the piece P to be braked.

The working movable members are formed by two curved shoes 23 and 24, whose faces which are opposite the faces provided with friction linings 25 have two stiffening ribs 26 and 27. A pin 28 is press-fitted simultaneously into the shoes 23 and 24, whereby to constitute a point of application of the efforts and a pivot by means of which said shoes rest in two half-cylindrical housings or recesses internally defined edgewise in the wings 10 and 11 of the jaws 8 and 9, in the same plane as that of the axis of rotation of the piece P and substantially in the median vertically curved zone of each jaw, whereby to insure the positioning, passage and low amplitude swivelling of said jaws. The latter are maintained in the half-cylindrical housings of the wings 10 and 11 by a resilient leaf member 29, which is substantially shaped as a basket handle, and the end parts of which are contoured so as to merge with and bear upon the pins 28 of shoes 23 and 24 in the direction for which said resilient member 29 has a tendency to spread apart the shoes one with respect ot the other, thereby to more firmly apply the pins 28 in their corresponding housings.

Consequently, the permanent action of the spring leaf 29 tends to also spread apart the jaws 8 and 9 in spite of the presence of the applying and releasing members 2 and 3, so that said spring member has also for its effect to compensate the construction plays or the plays susceptible to occur during the operation between the pins 7 and the bearings 6 supporting the sole-plate 5.

The radial holding of shoes 23 and 24 with respect to the pins 28 is insured by two fingers 30 housed in bores provided therefor in the lower part of said ribs 26 or 27 of each of the shoes. These fingers 30 are caused to frictionally engage the internal faces of the flanges 10 or 11 of the corresponding jaws, under the control of a coil spring 31 of which the ends are disposed in circular grooves in said fingers. A washer 32 is engaged in the turns of spring 31 thereby to avoid an entire sliding of the unit formed by the fingers and the spring, more particularly upon dismounting or replacing the shoes.

Beyond the recited curved or cambered part, jaws 8 and 9 include respectively a vertical straight part 33 or 34 by which they are associated to the braking or control member 2. The latter is constituted by two parallel horizontal rods 38, which are engaged in the straight part 34 of the web 13 of jaw 9 by their externally threaded end portion 39 respectively provided with a lock-nut 40. The control member 2 includes also a third rod 35 which is engaged in the straight part 33 of the web 12 of jaw 8, by having an externally threaded part 36 thereof upon which is screwed a nut 37 by any suitable means. The free end of said rod 35, which is carried by jaw 8 whereby to extend parallel to and between the rods 38 of the confronting jaw, carries a nut 45 or a like element susceptible to be axially locked so that to constitute the stop member of a washer 44 telescoped onto rod 35 and simultaneously slidably mounted on the rods 38. Said washer 44 forms the bearing element for one end of a compression coil spring 43 concentric to rods 35 and 38, and the other end of the spring is maintained by a retaining washer 42 axially locked on the rods 38 by two nuts or other members 41, but slidingly telescoped onto the central rod 35. Thus, by tightening or releasing the nut 37 of rod 35, said rod is caused to be axially displaced and, consequently the corresponding washer 44 is caused to be also axially displaced, which allows to vary the initial tension of spring 43 so that the restoring characteristics thereof meet the intended applications.

As it can be easy to understand, the position of spring 43 between the washers 42 and 44 tends to move the jaws 8 and 9 towards each other as well as the shoes 23 and 24 which are thus caused to frictionally engage the piece P. It is thus necessary to willingly insure the maintaining of the compressed spring whereby to obtain a spreading apart of the jaws thanks to which the shoes 23 and 24 will be sufficiently moved away whereby to leave the piece P to rotate freely.

The brake applying spring 43 is maintained under compression by the member 3 which is constituted in the present example by a common type electro-magnet 46 disposed upside down and pivotally mounted on a pin 47 which is carried by two lugs 48 formed by the end of the sole-plate 5 in the extension of jaw member 8. The core of said electro-magnet is extended by an exteriorly protruding rod 49, the end of which is threaded onto a pin 50 connecting the ends of operating bell-crank levers 51. The latter are pivotally mounted by the short arms 52 thereof upon a pin 56 carried by two bosses 54 formed by the wings 11 of jaw 9 substantially level with the upper part of shoe 24. Said short arms 52 of levers 51 also define between their pivot points on pin 53 and the large arms of levers 51 two bearings for a pin 55 onto which is telescoped a sleeve 56, as shown in FIG. 2. Said sleeve is fast to a reaction bar 57 extending parallel to the rods 35 and 38 so that its plain or smooth end part extending beyond an external threading 57a may be accommodated into a bore 58 machined through the web 33 of jaw 8. A nut 59 is screwed on the threaded part 57a of bar 57 thereby allowing, when positioning the device as well as during its operation, to adjust the play and the stroke of the shoes 23 and 24, by varying the spacing of the jaws 8 and 9 in the brake released position.

The electro-magnet 46 is so mounted that when it is excited the core thereof is caused to move in the direction for which the rod 49 is retracted and lowers through the pin 50 the operating levers 51.

Thus, when one desires to operate the releasing of the shoes in order to leave the piece P freely rotating, an electric energy is fed to electro-magnet 46 thereby to cause the levers 51 to rotate on pin 53. Such a rotation is transmitted by the recited reaction bar 57 of which the nut 59, which bears on the part 33 of jaw 8, applies on the latter a force tending to move the same away from the axis of rotation of piece P. In this position, the initial pivoting point on the pin 53 is displaced and is then located at the level of pin 55 carrying the sleeve 56, so that said rotation of the levers 51 also causes, through the short arms 52, the shoes to move away by the same extent from the piece P. However, during this rotation, it is to be noted that the displacement of the jaws 8 and 9 is also distributed by the presence of the forks 17 and rollers 19, whereby the shoes are moved away by the same extent from piece P, said extent being proportional to the stroke of the core of electro-magnet 46. During the separation of the jaws, the action of the compensating spring leaf 29 always maintain shoes 23 and 24 applied by the pins 28 in the aforesaid corresponding housings, which results in releasing the shoes from the piece P and in taking-up simultaneously the plays between the shoes and the jaws and the plays between the pivot pins 7 thereof and the bearings 6.

When jaws 8 and 9 move away, they also displace the washers 42 and 44 which, in moving one toward the other, compress the brake applying spring 43. The latter gives back the stored energy therein, when one interrupts the current fed to electro-magnet 46 so that the piece P is braked by the application of the shoes 23 and 24. In effect, the spring 43 then pushes back the washers 42 and 44, which retract through the rods 35 and 38 the jaws 8 and 9 one towards the other. Such a displacement of the jaws causes, through the reaction bar 57, the short arms 52 of the levers 51 to pivot, this resulting, through pin 50 and rod 49, in restoring the electro-magnet core to its initial position. As previously, the forks 17 and rollers 19 insure a simultaneous rotation of the jaws 8 and 9, this allowing to obtain a simultaneous application of the friction linings 27 of each shoe. It is evident that the working of the device causes the linings 25 to wear out and that it becomes necessary to change the starting position of the stroke of the jaws 8 and 9 to always take advantage of the most active part of the electromagnet stroke and of the substantially constant extent of the brake applying spring 43 of which the elongation modifies the return characteristics thereof.

Then, a periodical adjustment of the nut 59 of the reaction bar 57 is effected whereby to restore the clearance of the jaws 8 and 9 at its initial value, relatively to the rotating piece or part P, and a periodical adjustment of the nut 37 of rod 35 is also effected whereby to restore the working extent of spring 43 to the chosen region.

It is to be noted that, owing to the particular arrangement of the various above-described members, the weight of the core and that of the levers act in the same direction as the weight of the compensating spring leaf 29 and in an opposite direction to the force of spring 43, whereby the different stresses are always oriented in the same direction, and the construction or wear plays never occur, whichever may be the position of jaws 8 and 9.

It is evident that, in order to reduce the cost price of such a device, it may be contemplated to eliminate the forks 17 and rollers 19 and to replace them by a screw 60 screwed in a horizontal extension 60a of the web 12 of jaw 8, and the position of which may be locked by a jam nut 60b.

When the device is only equipped with said screw 60, the shoes are released in the following manner: the jaw 8, which is pushed by the nut 59 of rod 57 moves away from the piece P until the head of screw 60 engages the sole-plate 5. In this position, the jaw member 8 can no longer be displaced and the action of the levers 51, which is exerted on pin 55, is transmitted by the short arms 52 and pin 53 to jaw 9 which is thus caused to move away from piece P.

In the above-described embodiment, the power absorbed and then given back by the compensating spring 29 is not prejudicial to the output of the device, because the generated efforts are low and the corresponding frictions are virtually negligible. Moreover, said spring 29 gives back at the moment of the release the energy previously stored, so that it suffices to provide a brake applying spring 43 substantially stronger without comparatively varying the coercitive force of the electro-magnet 46.

Figure 5:
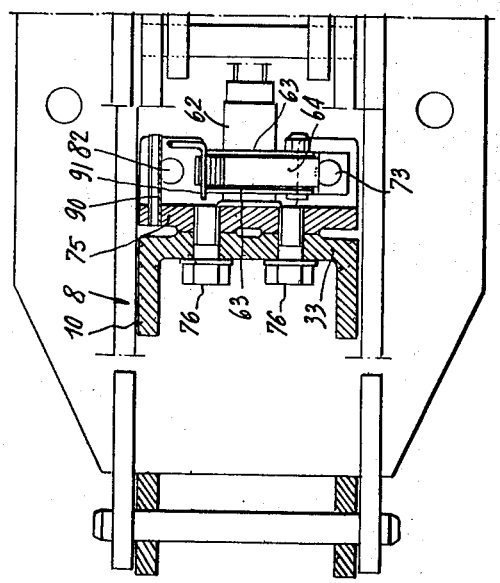
FIG. 5 is a fragmentary horizontal section taken substantially along the line V—V in FIG. 4.

FIGS. 4 to 9 show another embodiment of the device according to which the previously described device with reference to FIGS. 1 to 3 includes an automatic unit which compensates the wear of the brake linings, said unit being mechanically controlled. As shown in FIGS. 4 and 5, the nut 59 threaded upon the threading of the reaction bar 57 is replaced by a ratchet wheel 61 axially extended by two plain stub portions 62 carrying two end-plates 63 freely threaded onto said ratchet-wheel on either side thereof. A pawl 64 is pivotally mounted on a pin 65 integral with said end-plates so that a nose 66 formed by the pawl engages the teeth of the ratchet-wheel 61. These teeth are cut so that they have a steep slope always opposite the substantially vertical face of nose 66.

The part of the pawl which is opposite the nose 66 and defines also the bearing for the pivot 65 forms a semi-circulate heel 67 adapted to cooperate with an actuating linear cam member 68 (FIG. 6) the contour of which defines a recess 69 merging with a step 70 by an inclined ramp portion 71. Said linear cam is cut in a sleeve 72 added to a push-rod 73 which vertically slides in bores machined in the parallel flanges 74 of a U-shaped iron section 75 which is fast by means of screws 76 to the internal face of the straight part 33 of the web 12 of jaw 8. The lower end part of said push-rod 73, which extends under the flange 74 of the iron section 75, has a bearing 77 in which is disposed a pin or spindle 78 carried by two cheeks 79 pivotally mounted at the upper part thereof on a pin 80 which extends between two extensions 81 formed by the operating levers 51, respectively. Said cheeks 79 are pivotally mounted relatively to levers 51 so that, to insure in spite of the angular displacement of the latter, under the action of the brake applying spring 43 or at the moment when the electro-magnet 46 is excited, a vertical displacement of the push-rod 73 between the flanges 74 of the U-shaped iron member 75.

The action of cam 68 is combined with that of a return push-rod 82, which is mounted in an identical manner as the rod 73, in order to vertically slide between the iron section 75 flanges 74. The lower end part of said rod 82 has a bearing 83 defining an oblong aperture or slot 84 in which is also engaged the pin 78 fast to the cheeks 79. The upper end part of rod 82, which however extends below the upper flange 74 of iron section 75, is machined whereby to present, as shown in FIG. 6a, two successive notches 85 and 86, having different depths and extended by a flat 87. Both said notches 85 and 86 may alternatively accommodate the bent end 88 of the short arm of a spring 89, which is telescoped over a pivot 90 formed on or added to the vertical part of the iron section 75, so as to extend at the level of said flat 87. The large arm of spring 89 has also a bent end 91 adapted to bear upon the end-plates 63 carrying the pawl 84.

The operation of this mechanical unit for automatically compensating the wear of the braking linings is as follows:

Upon applying the jaws 8 and 9, the electrical energy exciting electro-magnet 46 is interrupted and the operating levers 51 resume their initial position under the releasing of the previously compressed spring 43. Lifting of the operating levers 51 results in a vertical displacement of the cheeks 79 and, thus, of pin 78. The latter controls then push-rod 73 and cam 68, but this has no immediate effect upon push-rod 82 owing to the presence of said slot 84. The vertical displacement of push-rod 73 moves the inclined ramp 71 of the linear cam 68 opposite the heel 67 of pawl 64 which is thus caused, together with the supporting end-plates 63, to pivot upon the stub portions 62 of the ratchet-wheel 61 without acting on the large arm of the return spring 89 whose bent end 88 of the short arm is wedged, as shown in full line in FIG. 6a, in the deepest notch 85. The pawl 64 thus is moved along a complete stroke, which is determined by the ramp 71 of cam member 68 and which causes the ratchet-wheel 61 to turn by an angular distance corresponding to one tooth thereof. said ratchet-wheel screws in a little more on the reaction bar 57, this reducing the effective length of the latter and, consequently, moving jaws 8 and 9 towards each other. This results in reducing the stroke and taking up the wear as well as decreasing the stroke of levers 51.

During the next actuation of the device whereby to release the shoes, pin 78 controlled by the cheeks 79 displaced by the levers 51 drives back push-rod 73 and linear cam 68 towards their initial positions in which said cam presents the recess 69 opposite the heel 67 of pawl 64, which remains in its position of partial angular limit stroke displacement, so that the subsequent displacements of cam 68 have no longer effect on said pawl.

It is evident that the vertical stroke of pin 78 is a function of that of levers 51 and, consequently, has a direct relation with the wear of the linings 25 which increases after each applying or braking stroke. Thus, as the operation of the device proceeds, the vertical stroke of pin 70 increases and the latter is caused to gradually engage, in a manner always increasing, the return push-rod 82 of the oblong aperture or slot being no longer sufficient to compensate the displacement of pin 78. Such successive engagements, transmitted by the large arm 91 of spring 89, increasingly tend to return the pawl 64, this tendency being not sufficient until the moment when the vertical stroke of pin 78 is sufficiently important to lift push-rod 82 by such an extent that the bent part 88 of the spring 89 short arm is able to engage the less deepest notch 86 and remain therein by means of a sharp nose 92 formed in the border zone of the notches 85 and 86. Said displacement of the push-rod 82 results in pivoting the spring 89 of which the large arm strongly acts through its bent part 91 on the end-plates 63 of pawl 64 which cannot retract owing to the presence of the step 70 of the cam 68 (FIG. 8). When pin 78 lowers again at the moment of a following action releasing the shoes, the linear cam 68 presents again the recess 69 oppositely to the heel 67 of pawl 64 which, this time, engages therein, while simultaneously the end-plates 63 pivot under the force of the spring 89 previously tightened, as aforementioned. The force delivered by spring 89 is maintained owing to the fact that the bent part 88 is engaged by the nose 92 which thus maintains the push-rod 82 locked in its upper position during a period of time determined which corresponds to the vertical path followed by the pin 78 in the oblong aperture or slot 84. The swivelling of the end-plates 63, caused by the action of the large arm of spring 89, is then sufficient to retract pawl 64 to such an extent that the nose 66 thereof may engage another tooth of ratchet-wheel 61. When pin 78 has effected, while driving the rod 73 and the cam 68, a vertical displacement corresponding to the length of slot 84, said pin comes to engage the bearing 83 of rod 82 and applies on the latter a sufficient force to cause, together with an additional temporary extension of spring 89, the escaping of the bent part 88 of said spring short arm, from over the nose 92. Rod 82 resumes then its initial position, and the bent part 88 engages again the deepest notch 85, this cancelling the force applied by said spring large arm on the end-plates 63 of pawl 64.

During the next braking application, the pin 78, driven by the levers 51, will again control the push-rod 73 and the linear cam 68 whose inclined ramp 71 will, as formerly, swivel the pawl 64. Since the nose 66 meshes with a new tooth of the ratchet-wheel 61, the rotation of pawl 64 and end-plates 63 results in rotating said ratchet-wheel in the direction for which the latter screws-in on the reaction bar 57 and, thus, reduces the effective length of said bar by an extent corresponding to the angular range of rotation and the threading characteristics of the reaction bar. The angular extent as well as the pitch of the threading are chosen so that to obtain a sufficient taking-up of the wear to drive back the shoes in such an initial position that the braking or applying stroke generated by the release of spring 43 and transmitted to the core of the electro-magnet 46 which is lifted by this stroke, is not higher than the feasible stroke of said core, because this would, by stopping the stroke of levers 51 and thus the stroke of the shoes 23 and 24, counteract the application of said shoes on the rotating piece P, and thus the effective application of the brake.

It is to be noted that the thrust of the pawl 64 on ratchet-wheel 61 occurs in the central part of the path followed by the brake levers 51 when the latter are again lifted, and that the used power to cause this rotation is the one which was stored by the brake applying spring 43 upon the preceding compression caused by the excited electro-magnet 46. This power is mostly available since the spring insures then only the lifting of the electro-magnet core, the lifting of the levers 51 and the compression of the compensating spring leaf 29. Thus, it remains as an actual available power which is normally intended for applying the shoes on the piece P, i.e. the one which is effectively used only when the shoes engage the piece P in the stroke limit part of the operating levers 51.

The various operations above-described are, of course, repeated in an analogous manner, as soon as the following brake applying and releasing strokes becomes too important, whereby to insure a new meshing of the pawl so that to induce another rotation of the ratchet-wheel and shorten to a corresponding extent the effective length of the reaction bar 57, which determines the amplitude of the strokes of shoes 23 and 24.

Figure 10:
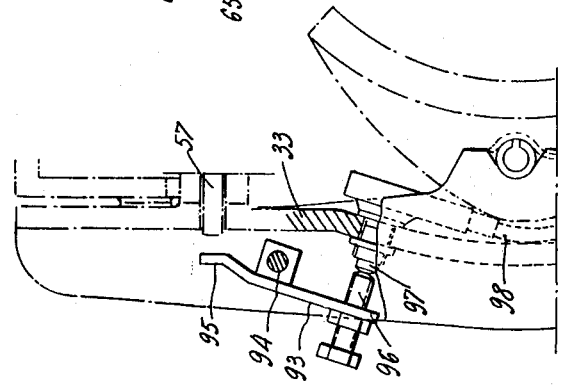
FIG. 10 is a view partly in elevation and partly in section illustrating an alternative embodiment of the device.

As the use of the device proceeds, the automatic adjustment of the stroke of the jaws as a function of the wear of the linings, causes the externally threaded end of the bar 57 to enter the bore 58, said end being progressively driven to protrude through the vertical straight part 33 of the jaw 8 web 12. The advance of the end of bar 57 may be advantageously used for cooperating with a visual or acoustical warning mechanism, as shown in FIG. 10, to inform the operator, or the skilled man responsible for the operation of a machine equipped with such a device about the condition and the possible period of time for operating the friction members. Such a mechanism is extremely valuable when the braking device is remote from the operator's eye or is hardly accessible, e.g. when it is mounted on an overhead gantry or on a crane or other like apparatus.

According to FIG. 10, the jaw 8 includes a lever 93 pivotally mounted in its median region on a pin 94 carried by the jaw wings 10. The position of pin 94 is chosen so that the upper end of lever 93, which forms a contact member 95, is disposed opposite and level with the bore 58 which allows the free passage of the plane end of the reaction bar 57. The lower end of the tilting lever 93 is provided with an adjustable contact member 96 adapted to cooperate with a pushbutton switch 97 carried by the web 12 of jaw 8 and connected to two electrical conductors 98 simultaneously fed when the electro-magnet is excited.

Thus, when the adjustment for taking-up the play drive sufficiently the end of bar 57 beyond the web of jaw 8, said end actuates by its contact member 95 the pivoting lever 93 which is caused, by means of the contact member 96 thereof, to depress the push-button switch 97. This closes the exciting circuit of any suitable visual or acoustical device, which thus gives to the operator at each releasing stroke an information relating to the condition of the friction linings 25 of the shoes 23 and 24.

As the linings wear out and the automatic adjustment proceeds, jaws 8 and 9 move closer one toward the other, whereby the spring is, in applying position, each time more released and thus no more insures the application of shoes 23 and 24 on piece P with the same effectiveness. To overcome this drawback, the device is provided with a unit for adjusting the tension of the spring, as shown in FIG. 11, which is associated with the play compensating mechanical member so as to act with the latter in a synchronous manner.

According to FIG. 11, the ratchet-wheel 61 is connected to a spur gear 99, for example mounted and keyed on the stub portion 62 extending in the direction of the jaw 9. Said gear 99 is adapted to mesh with another spur gear 100 mounted on a rod 101 extending between both jaws through which it extends to replace the central rod 35 of the embodiment described in relation to FIGS. 1 to 3. That end of said rod 101 which extends beyond jaw 8 is provided with an axial stop member 102, maintained by a locking element 103, while the end extending through jaw 9 is screw-cut such as at 104 from an externally threaded zone 105 on which is screwed the washer 44 maintaining the spring 43. As formerly, said spring is also retained by the washer 42 made fast to two parallel rods, outside of rod 101, the ends of which are fastened on the web 13 of jaw 9. The reference 106 designates a square or any other driving element provided at the end of the screw-cut part 104 so as to connect a suitable control member intended to rotate the rod 101, thereby to displace washer 44 in order to insure the initial adjustment of the working extent of spring 43.

Spur gear 100 is mounted on rod 101 thereby to be axially moved so as to be disconnected from gear 99 and disconnect rod 101 from the automatic wear taking-up unit. Thus, upon initially positioning the device, one effects the adjustment of the working extent and the tension of the brake applying spring 43, by displacing the gear 100 thereby to let said square 106 individually rotate rod 101 and axially move, in one direction or the other, the spring washer 44. During the normal operation of the device, the ratchet-wheel 61 is actuated by the pawl 64, as previously described, so that gear 99 drives, when said ratchet-wheel is angularly displaced by a determined extent, gear 100 which causes the rod 101 to rotate by a corresponding angular extent. This rotation is converted into a translation of the spring washer 44 which is moved towards the spring washer 42 whereby to compress the spring 43 by an extent so determined that the latter always works in the same reach of compression. To obtain this result, it is easy to understand that the threading 105 of rod 101 has a reverse pitch relatively to that of the reaction bar 57, so as to take into account the transmission by means of pinions or gears and nevertheless obtain a translation of the washer 44 corresponding to the reduction in length of said reaction bar 57.

It is to be noticed that, since the adjustment of the tension of the applying spring 43 is effected simultaneously with the automatic taking-up of the lining wear, it is not prejudicial to the braking force, because such an operation takes place during a non-operative stroke of the spring and is ended before the latter applies the shoes 23 and 24 on the piece P to be braked.

In the various embodiments above-described, it may happen when assembling the device that the latter is not exactly disposed in the axis of the piece P and, in such a case, one of the shoes is operative alone on piece P during a determined period of time. This results in an unbalance of the efforts, as well as asymmetrical strains, for the device and for the piece P or the supporting shaft thereof, which are susceptible to cause damage. To eliminate this drawback, provision is made to position a prestressing unit which not only insures symmetrical displacements of the shoes 23 and 24, but also allows low amplitude independent swivellings of jaws 8 and 9 whereby to take-up the centering differences or errors at the time of assembling the device.

Said prestressing unit, as shown in FIG. 12, is constituted by two springs 107 threaded over one of the pins or spindles 16 and 22 which carry the forks 17 and the small bars 21. Said springs are so mounted that one of their arms bears on the pins 7, on which swivel jaws 8 and 9, and on the other pins 16 and 22 carrying said forks and small bars. On the other hand, the pins 16 and 22 carrying the springs 107 and on which bear the arms have a substantially smaller diameter than the bearings provided for accommodating them in the horizontal extensions 14 and 15 of jaws 8 and 9, whereby to leave initial plays the amplitudes of which are taken-up by the action of the arms of said springs 107. Thus, upon a closing of the jaws 8 and 9, the forks 17 and the small bars 21 insure a conjugated displacement, but any one of the jaws may, in addition, take-up, against the antagonist action of the corresponding spring 107, the plays existing between the pins 16 or 22 and the extension 14 or 15, so that said one jaw be caused to swivel in the appropriate direction by an angular extent substantially higher than that of the opposite jaw, thereby to take-up the centering offset of the device and obtain a correct application of the shoes.

It is well evident that such a centering taking-up increases the tension of the stressed spring 107, this resulting in reducing by the same extent the action of the spring 43 applying the corresponding shoe 23 or 24. But, this applying difference is slight owing to the character of the prestressing springs 107, thereby slightly influencing the pression balancing of both shoes.

In addition, the pression difference in the shoes on the rotating piece P determines a difference in the wear of the linings of the shoes, this resulting in gradually eliminating the throwing-off center effect.

This embodiment is also advantageous in the case of a composite braking device of which the particular characteristics are explained hereinafter.

Such a composite device presents a noticeable interest in some particular application forms, more particularly for the horizontal translation mechanisms of the lifting apparatus for which it is useful to have at one's disposal a gradual control which is independent of the action of the applying spring 43, whereby to avoid a swinging motion caused by the inertia of the suspended loads, said swinging motion being generated, as it is easy to understand, by the fierce action of the release of spring 43. In such a device, the electromagnetic control is then solely used for insuring a definitive safety locking in the case of a prolonged stopping of the operation.

Figure 13:
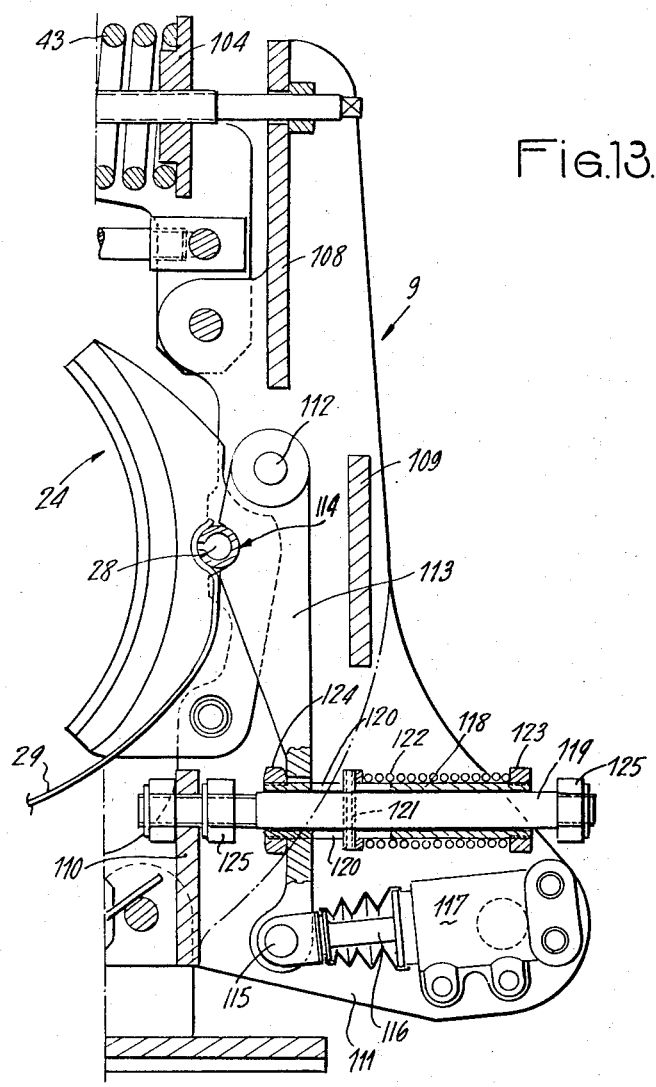

In the embodiment shown in FIG. 13, the device having a composite control is provided with a jaw 9 so shaped that the web 13, which is normally curved in the previously described examples, is on the contrary constituted by three straight parts 108, 109 and 110, respectively offset one from the other in a vertical plane. In addition to said three parts constituting the web 13, jaw 9 also includes in its lower end zone a substantially horizontal extension 111 from one of the wing members 11. The latter carry, in the median part thereof, a pin 112 on which is mounted the upper end of a swivelling lever 113, which defines a semi-cylindrical housing 114 adapted to match and bear upon the pin 28 of shoe 24 oppositely to the curved end of the compensating spring 29. The lower part of lever 113 is pivotally mounted by a pin 115 on the end of the piston rod 116 of a working hydraulic jack 117 carried by the extension 111. Moreover, in lever 113 extends therethrough a tubular sleeve 118 slidably mounted on a pin 119 which is fast to the part 110 constituting the web of jaw 9, in any suitable manner. Said tubular sleeve has two axial diametrically opposed holes 120 in which are disposed the ends of a cotter pin 121 transversely engaged in pin 119. A compression coil spring 122 is concentrically telescoped over tubular sleeve 118 so that one of its ends bear on the cotter pin 121, while the other end is maintained by a washer or a nut 123 placed on the free end portion of sleeve 118. The action of this return spring 122 is such that it always moves, through the washer or nut 123, the sleeve 118 in the direction for which a collar 124, mounted at the end opposite that which includes the nut 123, bears against lever 113 and swivels the latter, so that to tend to retract the piston rod 116 of the single acting jack 117 and to separate the housing 114 from the pin 28 of the shoes. The adjustment of the swivelling amplitude of lever 113, and consequently of the sliding stroke of said tubular sleeve, is insured by two nuts 125, respectively mounted in the vicinity of said straight part 110 and at the free end of pin 119.

When the lever 113 has been driven back by the return spring 122 to a neutral position for which the recess 114 thereof is cleared from the pin 28 of shoe 24, the electromagnet 46 can normally operate, as above-described, to close the jaws 8 and 9 or to drive the device into a released position. In this latter position, only the operator in charge of the operation of the machine or the apparatus provided with the device may then cause the gradual control member above-described to operate.

The operator has at his disposal a foot pedal by which he feeds the working jack with a fluid under pressure. The piston rod 116 moves then lever 113 whose recess 114 comes to engage the pin 28 of shoe 24, against the antagonistic action of the return spring 122 which is compressed between the cotter pin 121 and the nut 123. The thrust of lever 113 on the pin 28 of shoe 24 generates, by a reaction, a swivelling effect on the pin 112, this tending to retract jaw 9 while applying the shoe against the piece P. Since the actions of spring 43 and electro-magnet on the bar 57 are preponderant comparatively to the action of the prestressing springs 107, when jaw 9 moves away it drives in the same direction jaw 8, and the latter thus takes-up a part of the play existing between the bearings and the pins 16, this allowing the shoe 23 to be applied on the piece P. The braking, of which the effect is of course gradual, applied to the actuation of the jack 117 is stronger as the action on the foot pedal is stronger. When said braking reaches a higher value than that of the compression of the main braking spring 43, the jaw 9 moves away a little more from the piece P and determines at this time, a higher compression of spring 43, an additional deflection of spring 107 of the forks 17 and the engagement of collar 124 and nut 125. However, this allows, by suitably adjusting the various members of the mechanism, to obtain to limit the braking force to a value which is slightly higher than the compressive tension of spring 43, whereby to not exceed a certain value of the shoe application on piece P, defined by the initial tension of spring 43. An additional or further effort on the foot pedal only increases the effort which applies lever 113 through collar 124 on the adjustable stop nut 125, and slightly moves nut 59 or the ratchet-wheel 61 from the straight part 33 of the jaw 8 web 12.

It is easy to understand that during the use of the secondary control member having a gradual effect the wear resulting from the friction is not automatically taken-up by the ratchet-wheel 61 and pawl 64, but this increase in the stroke of the jaws is rapidly taken-up after several normal uses controlled by the electro-magnet 46.

FIG. 14 shows an alternative embodiment of the device, according to which the reaction bar 57 is formed by the piston rod 126 of a working hydraulic jack 127, of which the body, partly filled with oil, is carried by the straight part 33 of jaw 8. Said jack is connected, by a conduit 128, to a main jack 129 of lesser capacity of which the body is made fast to a lug 130 formed on the external face of the straight part 33 of the web 12 of the jaw 8. The piston of said jack 129 is associated to a rod 131 of which the end is mounted on a pin 132 engaged in two levers 133 pivotally mounted on a pivot pin 134 carried by the upper part of the jaw 8. The opposed ends of the levers 133 are connected together by a pin 135 engaged in that end of the rod 49 extending the core of electro-magnet 46. A conduit 136 opening into the upper part of the stroke of the main jack 129 is connected to the lower part of a capacity forming an overhead tank 137 carried by a lug 138 fast to one of the wings of jaw 8, as shown in FIG. 15.

Thus, when electro-magnet 46 is excited, rod 49 lowers the levers 133 which control the downward displacement of the rod 131 whose piston forces into the working cylinder 127 a constant quantity of oil for each operation and which is determined by the position of the inlet orifice of the conduit 136 which is covered by the descent of the piston thus compressing the liquid in jack 129. The liquid forced from this jack enters then the jack 127 by conduit 128 and pushes the piston and the rod 126, this causing the latter to open the jaws 8 and 9 and compressing the braking spring 43. When said spring, after the cutting of the current fed to the electro-magnet 46, gives back its stored energy to move the jaws toward each other and apply the shoes, the rod 126 pushes back the piston in the body or cylinder 127 and forces the liquid, previously admitted, into the main cylinder. This piston forces also an additional quantity of oil corresponding to the wear of the linings, but said quantity of oil, which is larger than the capacity of the main jack or cylinder 129, is drained off by conduit 136 towards the overhead tank 137 as soon as the piston of cylinder 129 uncovers the port communicating with conduit 136. Thus, when the linings have reached a maximum wear rate, all the oil initially contained within the working jack 127 is transferred in the capacity 137. Although not shown, said capacity may advantageously be provided with a free piston which is displaced by the change of level of the forced-back liquid and is adapted to cooperate with an electrical contact connected to the feeding circuit of a warning device the receiver of which is at the disposal of the operator in charge of the operation of the apparatus or machine equipped with said device.

As diagrammatically shown in dot-and-dash lines in FIG. 14, the body of jack 127 may also have thereon an electrical contact 139 whose movable member 140 is actuated by a finger 141 formed or added to the rod 126, whereby to close the electrical circuit exciting the warning device when the penetration of the rod 126 into the jack 127, resulting from the wearing out of the linings 25, has reached a determined value.

FIGS. 16 and 17 illustrate another embodiment of said device, according to which the actuation of the jaws and the shoes is effected by an entirely hydraulic control. Such control is constituted by a working jack 142 whose cylinder, which is mounted on the straight part 33 of jaw 8, includes a yoke 143 extending from its bottom. Said yoke carries a pin 144 on which is pivotally mounted the end of a reaction bar 145, which is freely engaged by the opposed end thereof in the bent part 146 of an L-shaped iron section 147 fast to the web of the jaw 9. A compression coil spring 149 concentrically surrounds the bar 145 whereby to bear on yoke 143 and on said bent part 146, respectively, so that its action always tends to push the jaws 8 and 9 in opposite directions. The piston 149 of jack 142 is associated to a free rod 150 which is mounted on a pin 151 carried by the ends of two operating links 152 which are pivotally mounted at their opposed ends on a pin 153 carried by the wings of jaw 9. Said pin 151, which is engaged in the end of the piston rod 150, is also carried by two crank members 154 the lower ends of which are pivoted on a pin 155 mounted on two lugs 156 which are extensions, substantially at the level of the axis of rotation of the piece P, of the jaw 8 wings.

As shown in FIG. 19, the cylinder of the jack 142 is connected by a conduit 157 to a main jack 158, of which the piston 159, acted upon by a return spring 160 disposed within the jack cylinder, has an extension constituted by a rod 161 connected to a lever 162 which is actuated by a foot pedal 163. Said lever 162, which is pivotally mounted at 164 beyond the connecting point of the piston rod 161, is acted upon by a return spring 165 which tends to maintain the lever against a fixed or adjustable stop member 166, in a position at which the piston rod 161 is entirely extended. The main jack 158 communicates, by a conduit 167 opening substantially at a higher level than the leading in of the conduit 157, with an overhead capacity 168 whereby to insure by gravity the flow of the liquid contained therein.

Thus, when the operator depresses the foot pedal 163, he pushes further the piston 159 against the antagonist action of the springs 165 and 160, and forces, when said pistons cover the orifice of conduit 167, the previously admitted liquid into the jack 142 cylinder by means of conduit 157. This liquid pushes then the piston 149, and the latter acts, through the rod 150 thereof, on the operating links 152 pulling the jaw 9 towards the jaw 8 and applying the shoes on the piece P to be braked. The displacement of the jaws 8 and 9 is transmitted and adjusted by the instrumentality of the forks 17 and rollers 19. When the jaws come closer one to the other, this results in compressing the opening spring 146. When the operator releases the foot pedal 163, the spring 148 gives back the energy stored therein during the preceding stroke and spreads apart the jaws 8 and 9, whereby the piston 149, actuated by the operating links 152, forces the previously admitted liquid in the jack 142 by conduit 157 towards the main jack 158.

It is to be noted that the release of the foot pedal 163 results in lifting the piston 159 of jack 158 under the action of spring 160, and that the liquid above said piston enters the discharge chamber by valves provided therefor. In this manner, the operator may eventually depress again the foot pedal 163 whereby to force an additional quantity of liquid towards the working jack 142 in the case where it is necessary to effect successive braking actions. When the piston 159 of jack 158 has been sufficiently lifted to uncover the orifice of conduit 167, the liquid discharged by the piston 149 of the working jack 142 flows through the main jack 158 and returns to the capacity 168 by said conduit 167.

The stroke amplitude of the jaws is determined by an adjusting bar 169 of which one end forms or carries a head 170 surrounding with a determined horizontal play a pin 171 which is maintained by two lugs 172 inwardly extending from the vertical part of the web 13 of the jaw 9. The other end of the bar 169, which extends through the straight part 33 of jaw 8, forms a rack 173, of which the steep face of the teeth thereof is oriented towards the nose 174 of a pawl 175 which is pivotally mounted on a pivot pin 176 integral with the upper part of jaw 8.

When the jaws are caused to spread apart one relatively to the other during a releasing stroke, the nose 174 of pawl 175 engages one of the teeth of the rack 173 and locks the corresponding end of the bar 169. Said bar allows only a spreading apart of the jaws which corresponds to the play left between the head 170 and the pin 171 which is driven at the maximum permissible stroke to the position as shown in FIG. 16. It is to be understood that the applying or braking stroke, in normal operation, also corresponds to the value of the same play, after which the jaw shoes are applied to the piece P to be braked. However, when the wearing out of the linings occurs, the bringing together of the jaws causes, after the normal stroke allowable by the play of the head 170 and the pin 171, the bar 169 to enter the jaw 8. When this wear out value reaches a determined extent, the penetration of bar 169 is sufficient to cause the nose 174 of pawl 175 to mesh with the following tooth of the rack 173, this having the result of accordingly reducing the effective length of the bar 169 for the next opening stroke of the jaws. There is thus obtained an automatic taking-up of the wear of the linings, and the total stroke of the jaws always ranges, on the one hand, from the minimum value corresponding to the designed play between the head 170 and the pin 171 and, on the other hand, to a minimum value as determined by this same play plus the extent of one tooth of said rack 173.

In a like manner as the example described in relation to FIGS. 14 and 15, it is possible to provide a warning unit whereby the operator is informed about the maximum wear degree of the linings. Such warning unit may be constituted by a contact member 177 carried by the jack 142 so that the movable element 178 thereof is actuated by a finger 179 adjustably formed or mounted on the bar 169. In thus manner, when the penetration of said bar into the jaw 8 has reached a chosen value, said finger 179 actuates the movable element 178 to close an exciting circuit of a visual or acoustical warning unit of which the receiver apparatus is at the disposal of the operator.

It is to be noted that, whichever may be the embodiment of the device hereinabove described (i.e. mechanical, hydraulic or composite) the braking (applying) and releasing members act in an antagonistic fashion whereby their action, which is complementary to that of the compensating spring leaf 29, results in exerting on the various movable members, irrespective of the fact that the shoes are applied or released, forces having a variable intensity but in the same direction, this allowing to take up the construction or wear plays which thus never appear.

What I claim is:
1. In a friction brake of the type having a base provided with pivot pin means,
   a pair of jaws each pivotally connected at one end to said base by means of said pivot pin means, and a brake lining carried by each jaw for engagement with a rotating member, the improvement consisting of mechanism for eliminating the effects of wear between the pivot pin means and the jaws insofar as brake actuation and release are concerned, the improvement comprising,
   brake applying means acting between the free ends of said jaws for urging same in opposite directions to engage said brake linings with an associated rotating member and causing said pivot pin means to react against each jaw in a particular direction when the brake is engaged,
   brake releasing means acting between the free ends of said jaws independently of said brake applying means for urging said jaws in directions opposite to those urged by said brake applying means so as to release the brake, said brake releasing means reacting against said jaws at points disposed on a line between a line containing the corresponding reaction points of the brake applying means against the jaws and said pivot pin means whereby the pivot pin means still react in the said particular directions against said jaws when said brake releasing means is operated to release the brake, said brake linings being provided with bearing pins and said jaws being provided with notches receiving the respective bearing pins,
   a U-shaped leaf spring bearing at its opposite ends against said bearing pins to urge same into seated relations within their respective notches,
   and means connecting said one ends of the jaws for constraining them to move in unison.

2. The brake as defined in claim 1 including independent control means for independently applying said brake when said brake releasing means is operative.

3. The brake as defined in claim 2 wherein said independent control means includes mechanism for moving one of said bearing pins out of its notch away from its corresponding jaw for engagement of the corresponding brake lining with the associated rotating member.

4. The friction brake as defined in claim 1 wherein said brake releasing means comprises a solenoid having a winding mounted on said frame, a vertically disposed armature received in said winding, a lever pivotally mounted at one end on one said jaw and extending horizontally therefrom to the upper end of said armature, a pivot joining said armature to said lever, a reaction rod pivotally connected to said lever adjacent its pivotal connection to said jaw and extending therefrom into abutment with the other said jaw, said armature being vertically downwardly movable by said winding when the brake is released, whereby the forces on the pivotal connections of said brake releasing means are always in the same direction to eliminate the effect of wear in said pivotal connections on brake releasing action.

5. The friction brake as defined in claim 4 including compensating means responsive to actuation of said brake releasing means for changing the length of said reaction rod to compensate for wear on said brake linings.

6. The friction brake defined in claim 5 including means actuated by said compensating means for adjusting said brake applying means to compensate for wear on said brake linings.

References Cited

UNITED STATES PATENTS

| | | | |
|---|---|---|---|
| 2,270,417 | 1/1942 | Cox | 188—171 |
| 2,380,796 | 7/1945 | Schnell | 188—75 |
| 2,554,330 | 5/1951 | Hodgson | 188—75 |
| 3,028,934 | 4/1962 | Lister | 188—171 |
| 3,032,146 | 5/1962 | Szabo et al. | 188—171 |
| 3,074,517 | 1/1963 | Kohli | 188—171 |
| 3,093,213 | 6/1963 | Limoges et al. | 188—106 |
| 3,095,950 | 7/1963 | Scheel | 188—216 X |
| 3,115,956 | 12/1963 | Trombetta | 188—171 |

DUANE A. REGER, *Primary Examiner.*